Patented Nov. 5, 1935

2,019,554

UNITED STATES PATENT OFFICE 2,019,554

PRODUCTION OF ALUMINA

Ralph B. Derr, Oakmont, Pa., assignor to Aluminum Company of America, Pittsburgh, Pa., a corporation of Pennsylvania No Drawing. Application July 19, 1932,
Serial No. 623,399

13 Claims. (Cl. 23—143)

This invention relates to the production of alumina from aluminous substances. It relates especially to the acid extraction of alumina from aluminous substances of varying grade, such as high and low grade bauxites, bauxite tailings, kaolin, clay and the like, and more specifically to a cyclic process of recovering alumina from such substances.

Various processes have been developed for treating the various ores of aluminum to recover alumina therefrom. These processes differ in many respects, especially with regard to the types of material which they are adapted to treat, and the purity of the material recovered. For example, alkaline processes such as the well-known Bayer process are widely used in extracting alumina from high grade bauxites and similar ores with low silica content, and with such ores they produce quite satisfactory results. On the other hand, when ores of higher silica content, such as clays and high silica bauxites or bauxite tailings discarded in the selection of material for the alkaline processes, are to be treated, an acid process must be used to prevent excessive losses of soda and alumina. The principal disadvantage of prior acid processes is that iron almost invariably accompanies aluminum in the aluminous ores treated, and is simultaneously dissolved during the digestion or extraction with acids. It is very difficult to remove the dissolved iron from the resulting digestion liquor, and to overcome this difficulty various expedients have been resorted to, such as calcining the ores prior to digestion, conducting the digestion of ores under high pressures, and neutralizing acid liquor from the digestion with previously recovered aluminum-oxide or with alkalies to precipitate iron. These expedients are costly, however, because of the expensive equipment required and/or the loss of reagents involved.

An object of my invention is to provide an improved process of extracting alumina from aluminous substances of varying grade including bauxites, clays and other ores of aluminum.

A second object of my invention is to provide an improved process of extracting alumina from aluminous substances with nitric acid, whereby a high yield of alumina substantially free from contamination with iron is obtained in an economical manner.

My invention has for further objects such other operative advantages and results as are found to obtain in the process described and claimed herewith.

My invention contemplates the extraction of alumina from aluminous materials with nitric acid to produce an acid liquor which is neutralized with basic aluminum nitrate mother liquor. Iron is thereby precipitated, and the precipitated iron and undissolved residues of aluminous material are separated from the neutralized liquor. The liquor is concentrated and cooled to crystallize aluminum nitrate, which is separated from the basic mother liquor, and the mother liquor is employed to neutralize a further quantity of acid digest liquor. The aluminum nitrate is decomposed by heat into alumina and nitric acid vapor. Nitric acid is recovered and employed in the extraction of a further quantity of aluminous material.

In the practice of my invention, nitric acid solution, which may contain an activating agent such as a fluorine compound, is heated with aluminous material such as bauxite tailings for a suitable period such as 1 to 5 hours or more. This digestion is preferably at atmospheric pressure, although higher pressures may be maintained, and the temperature is usually the boiling point of the slurry at the pressure employed. The acid is preferably of a concentration corresponding to 30% to 40% $HNO_3$, but may be of a higher or lower concentration such as 20% to 50%, and it is supplied to the digestion in such quantity that a high percentage of the alumina is extracted from the ore and a somewhat acid solution of aluminum nitrate is produced.

This acid nitrate liquor is neutralized or made somewhat basic by the addition of mother liquor obtained from the crystallization of aluminum nitrate in a subsequent stage of the process, and iron is precipitated quite completely. The neutralized nitrate liquor is then filtered to remove the precipitated iron and the undissolved residues from the extraction. The clear nitrate liquor thus produced is concentrated, driving off nitric acid and producing a more highly basic solution. This solution is cooled, whereupon aluminum nitrate crystallizes out, leaving a basic mother liquor which is preferably employed to neutralize a further quantity of acid liquor. The nitrate crystals are decomposed by heat into alumina and nitric acid vapors which may contain other oxides of nitrogen. These are carried off in the vapor state and recovered in the form of nitric acid solution for use in digesting further quantities of aluminous material. The alumina obtained is of high purity and substantially free from iron.

The advantages obtained in my improved process are numerous. Nitric acid is preferable to the other common acids because aluminum nitrate crystallizes in a very pure form from concentrated basic liquors and is readily decomposed into substantially pure alumina and nitric acid vapors. The nitric acid may be partially decomposed in this step, but is substantially completely recoverable for further use. A concentration of 30% to 40% $HNO_3$ in the digestion stage is preferable, since it attacks the ore more rapidly and removes the alumina more completely than more highly concentrated solutions, and requires less digestor capacity than more dilute solutions. It is to be understood that other concentrations of acid may be used and are operative, however, as indicated hereinabove.

Although pressures substantially higher than atmospheric may be maintained during digestion, and may sometimes be desirable to decrease the time required for digestion, I usually prefer to conduct the digestion at substantially atmospheric pressure. By my improved process the iron content of the liquor is reduced to a satisfactory point, even with atmospheric digestions, and a satisfactory yield of alumina is obtained.

Fluorine compounds or other activating agents in small quantity are effective in increasing the yield of alumina and facilitating the removal of iron in my process, in substantially the manner described in the copending application of Willmore and Callis, Serial No. 623,394 filed July 19, 1932. In my process hydrofluoric acid is generally more satisfactory as an activating agent than its salts, such as calcium fluoride, although the effect on the reaction is substantially the same in either case. When calcium fluoride or other salts are used, however, salts of the positive ion (e. g., calcium) tend to build up in the mother liquor and may eventually cause contamination of the recovered alumina. This is avoided when hydrofluoric acid is used.

Another advantage of hydrofluoric acid is that the fluorine may be more completely available than when salts, fluorspar, etc., are used. Furthermore, smaller amounts are required, such as 0.025% or more (usually 0.1% to 1%) of the weight of the ore treated, while with calcium fluoride, sodium fluoride, etc., about twice as much is needed.

The extraction of alumina from some ores is improved by calcination of the ore before the digestion at a temperature of 500° to 600° C., for example. The yield obtainable from some other ores is not materially improved by calcination, however, and it is not usually necessary to calcine any type of raw material to obtain good results with my present process.

The ratio of free acid to alumina employed in the digestion may be varied over a rather wide range such as 75% to 125%, for example, but the acid is usually supplied in such amount that it is equivalent to from 85% to 110% of the total alumina in the bauxite or other ore treated. I generally prefer to employ an acid to alumina ratio of about 95% to 101%. Such ratios are sufficiently high to give good extraction of the alumina in an atmospheric digestion, producing a more or less acid liquor containing aluminum nitrate and some free nitric acid. This liquor may also contain a considerable quantity of iron extracted from the ore.

Since it is desirable to crystallize aluminum nitrate from basic liquor to obtain the purest crystals, and since the elimination of iron is facilitated by basicity of the liquor, while the yield from the digestion is improved by maintaining an acid condition, several methods of neutralizing acid digest liquors have been considered. For example, such liquors may be neutralized with alkalies, but this is not satisfactory since it leads to losses of alkali and conversion of nitric acid to salts from which it may not be easily recovered without special treatment, and which are lost if the liquor is discarded. If the liquor is recirculated or returned to the system as described hereinabove, the fixed salts build up and eventually cause contamination of the product.

In another method which has been considered, the acid liquor from the digestion, containing iron, is separated from the mud or undissolved residue and re-digested with an excess of fresh bauxite or other aluminous material. The alumina is thereby partially extracted from the ore, the iron is mostly precipitated from the liquor, and a basic liquor low in iron is produced. This liquor is separated from the undissolved ore and precipitated iron, concentrated, and cooled to recover aluminum nitrate, which is decomposed to produce alumina and nitric acid. The undissolved ore is digested with fresh acid to complete the extraction of alumina therefrom. Most of the iron present in the ore and that which was previously precipitated are also dissolved, however, and a mud low in iron and alumina remains behind and is discarded. The acid liquor produced is high in iron and can be redigested with fresh ore to make it basic and to precipitate the iron. The basic liquor is separated from the residue and treated to recover aluminum nitrate as before, and the residue is digested with a further quantity of acid. This procedure may be repeated as many times as desired and is in effect a continuous countercurrent process.

While the process just described is effective in extracting alumina from its ores, it has certain definite disadvantages. Its principal disadvantage is that most of the iron is not discharged with the mud which has been redigested to complete the removal of alumina therefrom, but remains in the acid liquor and increases in amount with each cycle of redigestion. Consequently, it eventually builds up to such extent that it is necessary to discard a batch of acid liquor or a batch of partially extracted ore containing the accumulated iron. This results in a loss of alumina or nitric acid or both. Another disadvantage is that acid liquors and basic liquors must be filtered alternately, which makes necessary a greater investment in equipment.

In the preferred method of practicing my invention, these difficulties are entirely overcome. In the initial digestion with nitric acid an acid liquor is obtained, insuring a satisfactory extraction of alumina. Without separating this liquor from the undissolved residue, it is neutralized with basic liquor from the aluminum nitrate crystallization. This mixture is allowed to stand until precipitation of iron is substantially complete, and it is then filtered. Only a single filtration is thus necessary, and this one filtration is conducted with a basic liquor. The presence of the undissolved residue facilitates the precipitation and removal of the iron, probably by serving as a nucleus for its coagulation, and the filter cake (mud and precipitated iron) may be washed and discarded without substantial loss of alumina or acid.

The neutral or somewhat basic aluminum nitrate solution recovered as a filtrate is low in iron and may be concentrated and cooled without further treatment to produce aluminum nitrate crystals of high purity and basic mother liquor which is employed to neutralize a further quantity of acid digestion liquor. Another advantage of this procedure is that when hydrofluoric acid or other activating agents are employed, they remain in the mother liquor, and are returned to the neutralizing stage where they assist in the elimination of iron from the digest liquor. A reduction in the amount of fluorine compound added to the acid for the original digestion is thus made possible, as the same activating agent exerts its beneficial influence on the process repeatedly. This may also be accomplished by adding some of the basic mother liquor to the acid before or during the digestion.

Further advantages obtained in my process are that iron does not accumulate in the mother liquor to cause contamination of the recovered alumina, and that substantially no available alumina is lost by discarding liquor or residues. Since an acid liquor is produced by the digestion, the extraction of available alumina may be very complete. Alumina is not precipitated when the liquor is neutralized with basic mother liquor, but the iron is precipitated to such extent that the ratio of $Fe_2O_3$ to $Al_2O_3$ in the neutralized liquor is frequently about 0.2% or less. When this liquor is concentrated and $HNO_3$ vapors are driven off, it becomes more basic due to the presence of free alumina insoluble form or of basic aluminum nitrate. Normal aluminum nitrate crystallizes out, however, in substantially pure form, and the alumina which causes basicity remains in the mother liquor. Part or all of this alumina combines with free acid in the digest liquor on the next pass through the neutralizing stage, and at the same time the iron in the combined liquors is precipitated to substantially the same extent as before.

The aluminum nitrate crystals separated from the basic mother liquor are decomposed by heat, with or without the addition of steam, water, or the like, in known manner. The nitric acid evolved, and that driven off during concentration of the solution, are recovered, as by condensation or scrubbing, and used for the initial digestion of a further quantity of bauxite, clay, or other aluminous ore. The alumina remaining behind after decomposition of the nitrate is sufficiently pure for all ordinary purposes.

Example: Bauxite tailings containing 48.7% $Al_2O_3$, 11.44% $SiO_2$, 7.28% $Fe_2O_3$, and 6% $TiO_2$ were digested two hours with a solution containing 300 grams $HNO_3$ per liter and calcium fluoride amounting to 1% of the weight of bauxite tailings. One liter of acid was supplied for each .175 kg. of bauxite tailings. The digestion was made at atmospheric pressure and at the boiling point of the slurry (100° to 103° C.). A sample of the liquor was analyzed, and it contained 9.5 gms. $Fe_2O_3$ per 100 gms. $Al_2O_3$. Mother liquor from a previous aluminum nitrate crystallization was added, equal in amount to one-half the volume of the original acid solution. Two hours later the liquor was filtered and analyzed. The iron to alumina ratio had decreased from 9.5% to 0.45%, and 85.6% of the total alumina had been extracted.

It will be obvious to those skilled in the art that certain modifications can be made in the several steps of my process, in addition to those described by way of example hereinabove, without departing from the spirit of my invention, and it is my intention that the claims shall cover such modifications as are included within the scope thereof.

I claim as my invention:

1. In a process of extracting alumina from aluminous material by digesting said material with a solution containing nitric acid to form aluminum nitrate liquor which is concentrated and increased in basicity and cooled to crystallize aluminum nitrate, the step comprising adding mother liquor from the aluminum nitrate crystallization to aluminum nitrate liquor from the digesting stage.

2. In a process of extracting alumina from aluminous material with nitric acid in which an acid digestion liquor is produced by heating aluminous material with nitric acid, the acid liquor is neutralized and concentrated, whereby nitric acid is driven off, and aluminum nitrate is crystallized from the resulting basic liquor, the step comprising neutralizing acid digestion liquor with basic mother liquor from the aluminum nitrate crystallization.

3. In a process of extracting alumina from aluminous material containing iron, in which said material is digested with an aqueous solution containing nitric acid, thereby forming acid liquor which is then neutralized and concentrated to form a basic solution from which aluminum nitrate is crystallized, the combination of steps comprising adding basic mother liquor from the aluminum nitrate crystallization to the acid liquor in contact with the undissolved residue of the aluminous material, thereby neutralizing the acid liquor and precipitating iron dissolved therein, and separating precipitated iron and undissolved residue from the neutralized liquor.

4. The process of extracting alumina from aluminous materials, which comprises heating aluminous material with a solution of nitric acid to extract alumina in the form of aluminum nitrate liquor, adding basic aluminum nitrate mother liquor to the nitrate liquor, concentrating the resulting liquor and thereby driving off nitric acid and increasing the basicity of the liquor, crystallizing aluminum nitrate from the concentrated basic liquor, and adding the basic mother liquor remaining to a further quantity of aluminum nitrate liquor.

5. The process of extracting alumina from aluminous materials, which comprises heating aluminous material with a solution of nitric acid to extract alumina therefrom in the form of acid digestion liquor containing dissolved aluminum nitrate, neutralizing the digestion liquor with basic aluminum nitrate mother liquor, concentrating the resulting liquor and crystallizing aluminum nitrate therefrom, separating basic aluminum nitrate mother liquor from the crystals, and adding the separated mother liquor to a further quantity of acid digestion liquor.

6. The process of extracting alumina from aluminous materials, which comprises digesting aluminous material with a solution containing nitric acid and an activating agent to extract at least a substantial part of the alumina contained in the said material in the form of aluminum nitrate digestion liquor, adding basic aluminum nitrate liquor to the digestion liquor to increase its basicity, concentrating the resulting basic liquor, crystallizing aluminum nitrate therefrom, and adding the remaining basic aluminum nitrate liquor to a further quantity of digestion liquor.

7. The process of extracting alumina from aluminous materials containing iron, which comprises digesting aluminous material with a solution containing nitric acid and a small quantity of a fluorine compound to extract at least a substantial part of the alumina contained in the said material in the form of acidic aluminum nitrate solution, neutralizing the solution with basic aluminum nitrate mother liquor and thereby precipitating iron, separating the neutralized liquor from precipitated iron and undissolved residues of the aluminous material, concentrating the liquor and increasing its basicity, crystallizing aluminum nitrate from the concentrated basic liquor, separating basic mother liquor from the crystals, and adding the separated mother liquor to a further quantity of acidic aluminum nitrate solution.

8. The process of extracting alumina from aluminous materials containing iron, which comprises digesting aluminous material with a solution containing nitric acid and a small amount of hydrofluoric acid to extract alumina from the said material in the form of aluminum nitrate liquor, adding basic aluminum nitrate mother liquor to the liquor to precipitate iron, separating the liquor from precipitated iron, concentrating the liquor and increasing its basicity, crystallizing aluminum nitrate from the concentrated basic liquor, and adding the basic mother liquor to a further quantity of aluminum nitrate liquor.

9. The process of obtaining alumina from aluminous materials containing iron, which comprises digesting aluminuous material with a solution containing nitric acid to extract at least a substantial part of the alumina therefrom in the form of aluminum nitrate digestion liquor, adding basic aluminum nitrate mother liquor to digestion liquor to precipitate iron therefrom, removing precipitated iron and concentrating the liquor, crystallizing aluminum nitrate from the concentrated basic liquor, separating aluminum nitrate crystals from the basic mother liquor, adding the mother liquor to a further quantity of digestion liquor, and decomposing the aluminum nitrate crystals to obtain alumina.

10. The process of obtaining alumina from aluminous materials containing iron, which comprises digesting aluminous material with a solution containing nitric acid to extract at least a substantial part of the alumina therefrom in the form of aluminum nitrate digestion liquor, adding basic aluminum nitrate mother liquor to the digestion liquor to precipitate iron therefrom, removing precipitated iron and concentrating the liquor, crystallizing aluminum nitrate from the concentrated basic liquor, separating aluminum nitrate crystals from the basic mother liquor, adding the mother liquor to a further quantity of digestion liquor, decomposing the aluminum nitrate crystals by heat to obtain alumina and nitric acid, recovering the nitric acid in solution, and employing the solution to extract alumina from a further quantity of aluminous material.

11. The process of obtaining alumina from aluminous materials containing iron, which comprises digesting aluminous material with a solution containing nitric acid and a fluorine compound to extract at least a substantial part of the alumina from said material in the form of aluminum nitrate digestion liquor with acid reaction, neutralizing the digestion liquor with basic aluminum nitrate mother liquor and thereby precipitating iron, removing precipitated iron, concentrating the liquor by evaporation of water therefrom and thereby driving off nitric acid and increasing the basicity of the liquor, crystallizing aluminum nitrate from the concentrated basic liquor, separating aluminum nitrate crystals from the basic mother liquor, employing the mother liquor to neutralize a further quantity of digestion liquor, decomposing the aluminum nitrate crystals by heating to drive off nitric acid vapor, thereby obtaining substantially pure alumina, recovering the nitric acid in solution, and employing the solution to extract alumina from a further quantity of aluminous material.

12. The process of obtaining pure alumina from aluminous material containing iron or silica or both, which comprises digesting aluminous material with a sufficient quantity of a solution containing nitric acid to extract at least a substantial part of the alumina contained in the said material and to produce an acid digestion liquor containing the extracted alumina in the form of aluminum nitrate, adding to the digestion liquor in the presence of undissolved residues of the aluminous material sufficient basic aluminum nitrate mother liquor to neutralize the digestion liquor and precipitate iron therefrom, separating the neutralized substantially iron-free liquor from the precipitated iron and undissolved residues, concentrating the liquor and simultaneously increasing its basicity by driving off nitric acid, crystallizing substantially pure aluminum nitrate from the concentrated basic liquor, separating basic mother liquor from the aluminum nitrate crystals, adding the basic mother liquor to a further quantity of acid digestion liquor, decomposing the aluminum nitrate crystals by heat into nitric acid and substantially pure alumina, and separately recovering the nitric acid and the alumina.

13. In a process of extracting alumina from aluminous material with nitric acid in which an acid digestion liquor is produced by heating aluminous material with nitric acid, the acid liquor is neutralized and concentrated, and aluminum nitrate is crystallized from the resulting basic liquor, the step comprising allowing the neutralized digestion liquor to remain in contact with undissolved aluminous material until precipitation of iron from the liquor is substantially complete.

RALPH B. DERR.